(12) United States Patent
Olsson et al.

(10) Patent No.: US 9,463,893 B2
(45) Date of Patent: Oct. 11, 2016

(54) PACKAGING LAMINATE FOR A PACKAGING CONTAINER, AS WELL AS A PACKAGING CONTAINER PRODUCED FROM THE PACKAGING LAMINATE

(71) Applicant: TETRA LAVAL HOLDINGS & FINANCE S.A., Pully (CH)

(72) Inventors: Åsa Olsson, Höör (SE); Jörgen Högkvist, Karlstad (SE); Helena Tufvesson, Gävle (SE); Johan Larsson, Gävle (SE)

(73) Assignee: TETRA LAVAL HOLDINGS & FINANCE S. A., Pully (CH)

( * ) Notice: Subject to any disclaimer, the term of this patent is extended or adjusted under 35 U.S.C. 154(b) by 296 days.

(21) Appl. No.: 14/353,719

(22) PCT Filed: Nov. 29, 2012

(86) PCT No.: PCT/EP2012/073902
§ 371 (c)(1),
(2) Date: Apr. 23, 2014

(87) PCT Pub. No.: WO2013/098025
PCT Pub. Date: Jul. 4, 2013

(65) Prior Publication Data
US 2014/0305997 A1    Oct. 16, 2014

(30) Foreign Application Priority Data

Dec. 29, 2011  (SE) ...................................... 1151288

(51) Int. Cl.
*B65D 1/22* (2006.01)
*B32B 27/32* (2006.01)
*B32B 29/00* (2006.01)

(52) U.S. Cl.
CPC ................. *B65D 1/22* (2013.01); *B32B 27/32* (2013.01); *B32B 29/002* (2013.01); *B32B 2255/12* (2013.01)

(58) Field of Classification Search
CPC ....... B65D 1/22; B32B 27/32; B32B 29/002; B32B 2255/12
See application file for complete search history.

(56) References Cited

FOREIGN PATENT DOCUMENTS

| DE | 102 52 553 A1 | 6/2004 |
| EP | 0 754 800 A2 | 1/1997 |

(Continued)

OTHER PUBLICATIONS

International Search Report (PCT/ISA/210) mailed on May 31, 2013, by the European Patent Office as the International Searching Authority for International Application No. PCT/EP2012/073902.

*Primary Examiner* — Michael C Miggins
(74) *Attorney, Agent, or Firm* — Buchanan Ingersoll & Rooney PC (57) ABSTRACT

A packaging laminate for a packaging container, which includes a paper or paperboard layer and outer, liquid-tight, heat-resistant layers of plastic on both sides of the paper or paperboard layer. Between the paper or paperboard layer and the outer plastic layer, the packaging laminate has at least one additional layer of a material possessing tightness properties vis-à-vis gases. In order to improve the preconditions for being able to provide the packaging laminate with decorative artwork of printing ink with good print quality, the paper or paperboard layer has, on both sides, a coating of pigment, adhesive and a substance capable of modifying the rheological properties of the coatings.

15 Claims, 4 Drawing Sheets (56) References Cited

FOREIGN PATENT DOCUMENTS

| | | |
|---|---|---|
| EP | 1 736 504 A1 | 12/2006 |
| JP | 2004017984 A | 1/2004 |
| JP | 2010-133050 A | 6/2010 |
| JP | 2011-236516 A | 11/2011 |
| WO | 2008/094085 A1 | 8/2008 |
| WO | 2009/123560 A1 | 10/2009 |
| WO | 2010/093563 A1 | 8/2010 |
| WO | 2010/114467 A1 | 10/2010 |
| WO | 2011/003566 A1 | 1/2011 |
| WO | WO 2012/044229 A1 | 4/2012 |

PACKAGING LAMINATE FOR A PACKAGING CONTAINER, AS WELL AS A PACKAGING CONTAINER PRODUCED FROM THE PACKAGING LAMINATE

TECHNICAL FIELD

The present invention relates to a packaging laminate for a packaging container which, after filling and sealing by thermosealing, is to be subjected to a shelf-life extending heat treatment in a retort with steam as the heat medium, the packaging laminate comprising a layer of paper or paperboard whose one side has a printable coating of pigment and binder or adhesive in contact with the paper or paperboard layer. The present invention also relates to a packaging container produced from the packaging laminate.

BACKGROUND ART

A packaging laminate of the type described above is previously known in the art from, for example, International Patent Application PCT/SE2011/050978.

The packaging laminate according to International Patent Application PCT/SE2011/050978 has a rigid, but foldable layer of paper or paperboard and outer, heat-resistant layers of plastic on both sides of the paper or paperboard layer. Between the paper or paperboard layer and one of the outer, heat-resistant plastic layers, the prior art packaging laminate has at least one further layer possessing tightness properties vis-à-vis gases, in particular oxygen gas. One preferred example of such a gas tightness layer is an aluminium foil (Alifoil) which moreover makes for thermosealing of the packaging laminate by so-called induction thermosealing which is a both rapid, simple and efficient sealing technology.

Since a paper or paperboard surface often has a coarse and uneven surface profile which impedes direct printing on the paper or paperboard layer with constant good print quality, it is, in certain cases, necessary to pre-treat, for purposes of improving quality, the paper or paperboard surface which is to be printed and decorated with printing ink. To this end, the paper or paperboard layer in the prior art packaging laminate displays, on that side which is intended to be printed with printing ink, a smooth printable coating of pigment and binder or adhesive in contact with the paper or paperboard layer.

The prior art packaging laminate according to the foregoing is produced from a web of paper or paperboard which, on its one side, has a printable coating of pigment and adhesive. The web is unwound from a magazine reel and led through a printing station in which the web, on its pigment-coated side, is provided with the desired decorative artwork of printing ink which is printed direct on the printable coating. From the printing station, the paper or paperboard web now provided with decorative artwork is led further to a lamination station in which the other, or uncoated, side of the web is provided with a layer of a material possessing desirable tightness properties vis-à-vis gases, e.g. an aluminium foil, which is laminated to the paper or paperboard web. From the lamination station, the laminated web is led to a coating station in which the web is finally coated with outer, heat-resistant layers of plastic which are extruded on both sides of the web, whereafter the web is wound up for further handling and use.

From the prior art packaging material, packages are produced using modern packing and filling machines, which, from a web or from prefabricated blanks of the packaging material, produce filled, sealed packages.

From, for example, flat folded tubular blanks of the packaging material, packages are thus produced in that the packaging blank is first raised to an open packaging carton. The one end of the packaging carton (e.g. the bottom end) is sealed by fold forming and thermosealing of the corresponding foldable bottom panels of the packaging carton. The packaging carton provided with a bottom is filled with optional food, whereafter the other, open end of the packaging carton (in this example the top end) is sealed by an additional fold forming and thermosealing of the corresponding foldable top panels of the packaging carton.

There occur on the market so-called retortable packages or cartons which are intended to be filled with food and, after sealing, subjected to a shelf-life extending heat treatment in a retort with steam as the heat medium. Analogous with so-called aseptic packages (of which the parallelepipedic package entitled Tetra Brik Aseptic is the predominant package on the market), the retortable packages possess the ability to be able to store the packed food for several months and even longer at ambient temperature, without the food deteriorating or being destroyed before its recommended "best before date". One well-known example of such packages is those marketed under the name Tetra Recart.

Packing containers of the prior art packaging laminate possess many valuable advantages, not least for the consumer. They are mechanically strong and dimensionally stable, at the same time as they are both easy to open and convenient to use. Moreover, they possess the advantage over corresponding preserve cans of sheet metal and plastic that, after emptying, they may readily be compressed to only minimum space requiring planar sheets by simple manual flattening.

However, with the prior art packaging laminate, it not seldom occurs that problems with undesirably uneven print quality arise in connection with printing of the pigment-coated paper or paperboard web. In particular, it has proved that such problems are often caused by fibre dust which has been released from the freely exposed fibre surface of the paper or paperboard web and transferred to and adhered on the surface of the printable coating when the web coated on one side is wound up from the paper machine which produce the web. When the wound up web is subsequently unwound for printing and further processing into finished packaging laminate, released fibre dust thus accompanies the web adhering to the pigment coating of the paper or paperboard web into the printing station where the dust thus counteracts and impedes printing direct on the printable coating.

There is thus a need in the art for an improved packaging laminate which is both easier and simpler to produce without accompanying problems of the type which are associated with printing of the prior art packaging laminate.

OBJECTS OF THE INVENTION

One object of the present invention is therefore to satisfy this need.

A further object of the present invention is to realise a packaging laminate of the type described above, without accompanying dust-related problems, as mentioned above.

Yet a further object of the present invention is to realise a packaging container produced by fold forming and thermosealing of the packaging laminate, which container, after filling and sealing by thermosealing, is to be subjected to a shelf-life-extending heat treatment in a retort with steam as the heat medium.

BRIEF OUTLINE OF THE INVENTION

According to one aspect of the invention, there will be realised a packaging laminate for a packaging container which, after filling and sealing by thermosealing, is, for purposes of extending its shelf-life, to be subjected to a heat treatment in a retort with steam as the heat medium, the packaging laminate including a layer of paper or paperboard whose one side has a printable coating of pigment and adhesive in contact with the paper or paperboard layer. The packaging laminate is characterised in that the other side of the paper or paperboard layer also has a coating of pigment and adhesive in contact with the paper or paperboard layer.

When a web of paper or paperboard which, on both of its sides, has a coating of pigment and adhesive, is rolled up onto a magazine reel after production in a paper machine, this thereby effectively counteracts fibre dust from being released from the web. Thus, the wound up paper or paperboard web coated on both sides may, on a later occasion, be unwound and printed direct on the printable coating which, as a result, is practically completely free of such fibre dust and, therefore, may be printed with the desirable uniform print quality.

For practical reasons, it is to be preferred that the coatings on both sides of the paper or paperboard layer are of the same composition. However, these two coatings need not be of equal thickness. Thus, the printable coating may be slightly thicker than the corresponding coating on the other side of the paper or paperboard layer. For example, the printable coating may have a thickness of 15-30 $g/m^2$, preferably 20 $g/m^2$, while a corresponding coating on the other side of the paper or paperboard layer may have a thickness of less than 10 $g/m^2$, preferably approx. 5 $g/m^2$.

In one practical embodiment of the packaging laminate according to the present invention, each respective coating on both sides of the paper or paperboard layer includes a combination of pigment and adhesive as well as at least one additional substance capable of modifying the rheological properties of the coating. Examples of usable coating compositions may be those which are described in International Patent Application PCT/SE2011/050978.

Examples of usable adhesives for the two coatings mentioned above have been selected from the group essentially comprising styrene butadiene latex, methyl metacrylate butadiene latex, polyacrylate latex, styrene acrylic latex, polyvinyl acetate, polyvinyl alcohol, polysaccharides, starch, protein and combinations thereof.

Examples of usable substances capable of modifying the viscosity of each respective coating are selected from the group essentially comprising protein, polysaccharides, carboxy methyl cellulose (CMC), hydroxy ethyl cellulose (HEC), alkali soluble acrylic polymer emulsion (ASE), hydrofobically modified alkali soluble acrylic polymer (HASE), polyurethane (PU), polyvinyl alcohol (PVOH) and starch.

Examples of usable pigment for the two mentioned coatings are selected from the group essentially comprising layered silicate mineral, hydratised magnesium silicate, calcium carbonate, titanium dioxide and kaolin.

In one practical embodiment of the packaging material according to the present invention, at least 50% of the pigment in the printable coating is calcium carbonate, while both the adhesive and the above mentioned rheology modifier include an acrylic copolymer.

In particular, the printable coating in the packaging material according to the present invention may contain: an adhesive of a styrene acrylic copolymer in an amount of 10-20% calculated on the weight of the composition; pigment of layered silicate mineral and calcium carbonate in a quantity of 80-90%, calculated on the weight of the composition; and a rheology modifier in an amount of 0.1-1% calculated on the weight of the composition.

As was mentioned above, the coating applied for purposes of dust inhibition is of lesser thickness or coating quantity than the coating applied for purposes of improving printability. The dust inhibiting coating has a thickness or coating quantity of less than 10 $g/m^2$, preferably approx. 5 $g/m^2$, while the printability improving coating has a corresponding thickness or coating quantity of 15-30 $g/m^2$, preferably 20 $g/m^2$.

In order to protect the moisture- and liquid-sensitive paper or paperboard layer from penetration by moisture and liquid, the packaging laminate according to the present invention displays outer, liquid-tight coatings of plastic which moreover should be sufficiently heat-resistant to withstand such temperatures to which a packaging container produced from the packaging laminate may be exposed when the sealed packaging container, together with its filled contents, is heat treated in a retort with steam as the heating medium. Examples of usable plastics for the outer, heat-resistant layers may be selected from the group essentially comprising high density polyethylene, linear low density polyethylene, polypropylene and polyester.

The packaging laminate according to the present invention may be supplemented with at least one additional layer of a material possessing superior tightness properties vis-à-vis gases, in particular oxygen gas. Examples of materials possessing the desirable gas tightness properties may be so-called barrier polymers, such as for example ethylene vinyl alcohol copolymer and polyamide. Preferably however, this layer consists of an aluminium foil, Alifoil, which renders the packaging laminate thermosealable by so-called induction thermosealing which is a both rapid and efficient sealing technology.

According to another aspect of the present invention, there will be realised a packaging container which, after filling and sealing by thermosealing is, for purposes of extending its shelf-life, exposed to a heat treatment under pressure with steam as the heating medium in a retort.

BRIEF DESCRIPTION OF THE ACCOMPANYING DRAWINGS

The present invention will now be described in greater detail hereinbelow, with particular reference to the accompanying Drawings. In the accompanying Drawings.

DETAILED DESCRIPTION OF THE ACCOMPANYING DRAWINGS

Figure 1:
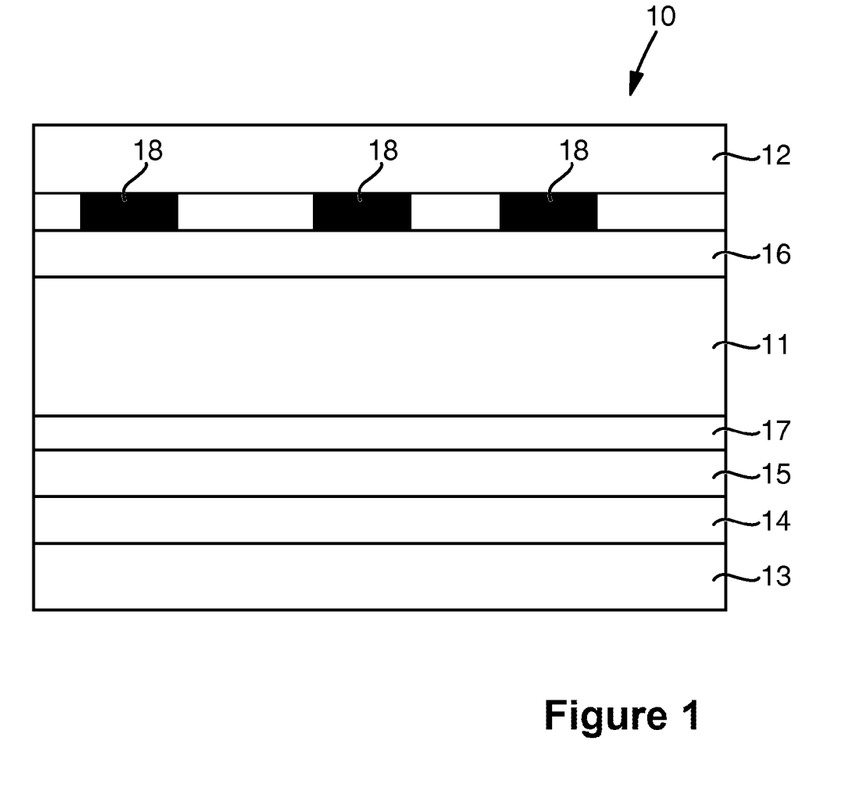
FIG. 1 is a schematic cross sectional view of a packaging laminate according to one embodiment of the present invention.

FIG. 1 thus schematically illustrates a cross section of a packaging laminate according to a first embodiment of the present invention. The packaging laminate 10 has, in the illustrated example, a layer 11 of paper or paperboard and outer, liquid-tight heat-resistant layers 12 and 13, respectively, of plastic on both sides of the paper or paperboard layer 11. Between the paper or paperboard layer 11 and one of the two outer, liquid-tight plastic layers 13, the packaging laminate 10 moreover has a layer 14 of a material possessing tightness properties vis-à-vis gases, in particular oxygen gas, which is laminated to the paper or paperboard layer 11 by the intermediary of a lamination layer 15.

As schematically illustrated in FIG. 1, the paper or paperboard layer 11 has, on its one side, a printable coating 16 of pigment and adhesive in contact with the paper or paperboard layer 11. As was mentioned previously, the printable coating 16 also includes a substance with the ability of modifying the rheological properties of the coating 16.

It will further be apparent from FIG. 1 that the paper or paperboard layer 11 has, on its other side, a corresponding coating 17 of pigment and adhesive in contact with the paper or paperboard layer 11 and, analogous with the printable coating 16 on the one side of the paper or paperboard layer 11, the coating 17 also includes a substance capable of modifying the rheological properties of the coating 17.

Usable examples of pigment for the coatings 16 and 17 are, as was mentioned previously, selected from the group essentially comprising layered silicate mineral, hydratised magnesium silicate, calcium carbonate, titanium dioxide and kaolin.

Examples of usable adhesive for both of the above mentioned coatings 16 and 17 are selected from the group essentially comprising styrene butadiene latex, methyl metacrylic butadiene latex, poly acrylate latex, styrene acrylate latex, polyvinyl acetate, polyvinyl alcohol, polysaccharides, starch, protein and combinations thereof.

Examples of usable substances capable of modifying the viscosity of each respective coating 16 and 17 are selected from the group essentially comprising protein, polysaccharides, carboxy methyl cellulose (CMC), hydroxy ethyl cellulose (HEC), alkali soluble acrylic polymer emulsion (ASE), hydrofobically modified alkali soluble acrylic polymer (HASE), polyurethane (PU), polyvinyl alcohol (PVOH) and starch.

In the illustrated embodiment of the packaging material 10 according to the present invention, at least 50% of the pigment in the printable coating 16 is calcium carbonate, while the binder as well as the above mentioned rheology modifier include an acrylic copolymer.

As was mentioned previously, the coating 17 is of lesser thickness or coating quantity than the printable coating 16. The coating 17, whose primary purpose is to counteract a release of fibre dust from the surface of the paper or paperboard layer 11, has a thickness or coating quantity of less than 10 $g/m^2$, preferably approx. 5 $g/m^2$, while the printability-improving coating 16 has a corresponding thickness or coating quantity of 15-30 $g/m^2$, preferably 20 $g/m^2$.

In order not to conceal printed artwork of printing ink printed on the printable coating 16 (schematically illustrated at reference numeral 18), the outer, liquid-tight heat-resistant plastic layer 12 of the packaging material 10 is preferably sufficient transparent so that the printed decorative artwork 18 is clearly visible on visual inspection.

Examples of such usable plastics for the outer, liquid-tight heat-resistant layer 12 may be selected from the group essentially comprising high density polyethylene (HDPE), linear low density polyethylene (LLDPE), polypropylene (PP) and polyester (PET).

Usable plastics for the outer, liquid-tight heat-resistant layer 13 of the packaging laminate 10 may also be selected from the same group as the usable plastics for the outer, liquid-tight heat-resistant layer 12, i.e. from the group essentially comprising high density polyethylene (HDPE), linear low density polyethylene (LLDPE), polypropylene (PP) and polyester (PET).

Examples of materials possessing gas tightness properties for the layer 14 may be so-called barrier polymers, such as for example ethylene vinyl alcohol copolymer (EVOH) and polyamide (PA). Preferably however, the layer 14 is an aluminium foil, Alifoil, which renders the packaging laminate 10 thermosealable by so-called induction thermosealing which is a both rapid, simple and efficient sealing technology.

Figure 2:
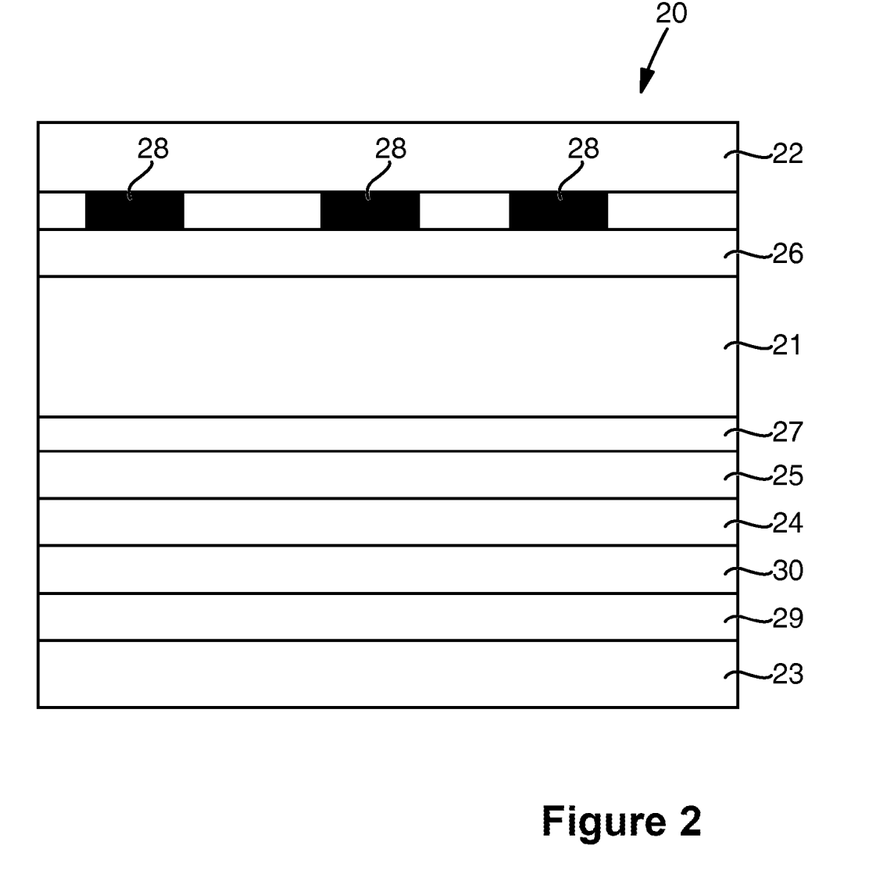
FIG. 2 is a schematic cross sectional view of a packaging laminate according to another embodiment of the present invention.

FIG. 2 schematically illustrates a packaging laminate according to a second embodiment of the present invention. The packaging laminate 20 has, in the illustrated example, a layer 21 of paper or paperboard and outer, liquid-tight, heat-resistant layers 22 and 23, respectively, of plastic on both sides of the paper or paperboard layer 21. Between the paper or paperboard layer 21 and one of the two outer, liquid-tight plastic layers 23, the packaging laminate 20 moreover has a layer 24 of a material possessing tightness properties vis-à-vis gases, in particular oxygen gas, which is laminated to the paper or paperboard layer 21 by the intermediary of a lamination layer 25.

As illustrated schematically in FIG. 2, the paper or paperboard layer 21 has, on its one side, a printable coating 26 of pigment and adhesive in contact with the paper or paperboard layer 21. As was mentioned previously, the printable coating 26 also includes a substance capable of modifying the rheological properties of the coating 26.

It will further be apparent from FIG. 2 that the paper or paperboard layer 21, on its other side, has a corresponding coating 27 of pigment and adhesive in contact with the paper or paperboard layer 21, and analogous with the printable coating 26 on the one side of the paper or paperboard layer 21, the coating 27 also includes a substance capable of modifying the rheological properties of the coating 27.

Usable examples of pigment for the coatings 26 and 27 are, as was mentioned previously, selected from the group essentially comprising layered silicate mineral, hydratised magnesium silicate, calcium carbonate, titanium dioxide and kaolin.

Examples of usable adhesives for the two above mentioned coatings 26 and 27 are selected from the group essentially comprising styrene butadiene latex, methyl metacrylate butadiene latex, polyacrylate latex, styrene acrylate latex, polyvinyl acetate, polyvinyl alcohol, polysaccharides, starch, protein and combinations thereof.

Examples of usable substances capable of modifying the viscosity of each respective coating 26 and 27 are selected from the group essentially comprising protein, polysaccharides, carboxy methyl cellulose (CMC), hydroxy ethyl cellulose (HEC), alkali soluble acrylic polymer emulsion (ASE), hydrofobically modified alkali soluble acrylic polymers (HASE), polyurethane (PU), polyvinyl alcohol (PVOH) and starch.

In the illustrated embodiment of the packaging material 20 according to the present invention, at least 50% of the pigment in the printable coating 26 is calcium carbonate, while both the adhesive and the above mentioned rheology modifier include an acrylic copolymer.

As was mentioned previously, the coating 27 is of a lesser thickness or coating quantity than the printable coating 26. The coating 27, whose primary purpose is to counteract release of fibre dust from the surface of the paper or paperboard layer 21, is of a thickness or coating quantity of less than 20 g/m$^2$, preferably approx. 5 g/m$^2$, while the printable coating 26 has a corresponding thickness or coating quantity of 15-30 g/m$^2$, preferably 20 g/m$^2$.

In order not to conceal decorative artwork of printing ink printed on the printable coating 26 (schematically illustrated at reference numeral 28), the outer, liquid-tight, heat-resistant plastic layer 22 of the packaging material 20 should preferably be sufficiently transparent in order for the printed decorative artwork 28 to be clearly visible on a visual inspection of the packaging laminate 20.

Examples of such usable plastics for the outer, liquid-tight, heat-resistant layer 22 may be selected from the group essentially comprising high density polyethylene (HDPE), linear low density polyethylene (LLDPE), polypropylene (PP) and polyester (PET).

Usable plastics for the outer, liquid-tight, heat-resistant layer 23 of the packaging laminate 20 may also be selected from the same group as the usable plastics for the outer, liquid-tight, heat-resistant layer 22, i.e. from the group essentially comprising high density polyethylene (HDPE), linear low density polyethylene (LLDPE), polypropylene (PP) and polyester (PET).

Examples of materials possessing gas tightness properties for the layer 24 may be so-called barrier polymers, such as for example ethylene vinyl alcohol copolymer (EVOH) and polyamide (PA).

The packaging laminate 20 in FIG. 2 differs principally from the packaging laminate 10 in FIG. 1 in that, for purposes of improving gas barrier properties, it is supplemented with at least one additional layer 29 which, via an adhesive 30, is bonded to the gas barrier layer 24 between the outer, liquid-tight, heat-resistant layer 23 and the above mentioned gas barrier layer 24. The supplementary gas barrier layer 29 is preferably an aluminium foil, Alifoil, which renders the packaging laminate 20 thermosealable by so-called induction thermosealing which is a both rapid, simple and efficient sealing technology.

Figure 3:
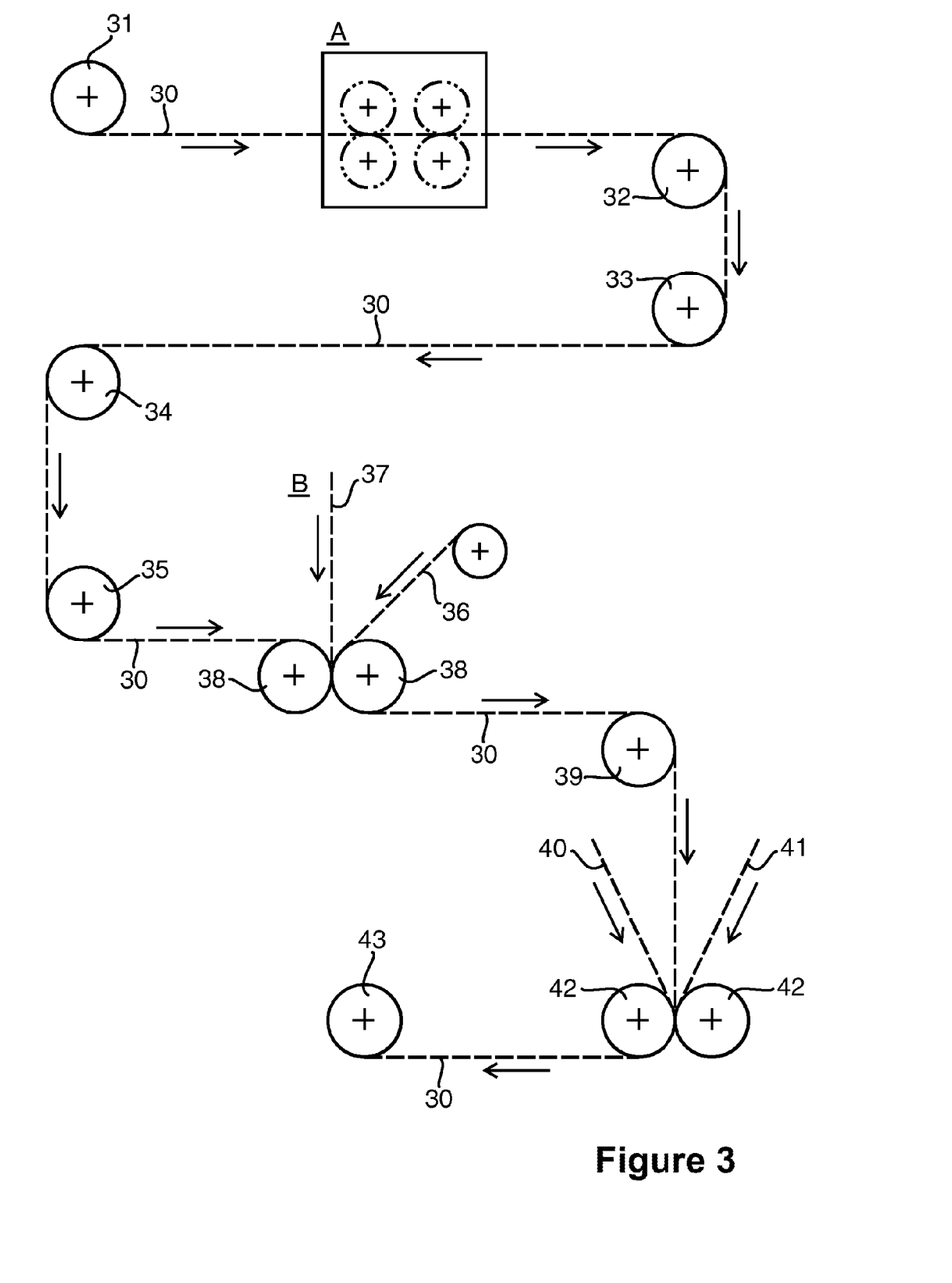
FIG. 3 schematically illustrates a method of producing the illustrated packaging laminate according to FIG. 1.

The illustrated packaging laminate in FIG. 1 is produced in, for example, the manner schematically illustrated in FIG. 3.

A web 30 of paper whose both sides are coated with pigment and adhesive, as described in greater detail in connection with FIGS. 1 and 2, is unwound from a magazine reel 31. The web 30 is led through a printing station at A where the paper web 30 is provided with the desired decorative artwork of printing ink which, by suitable printing technique, is printed direct on the surface of the printable coating of pigment and adhesive.

From the printing station A, the paper web 30 thus provided with decorative artwork is led via bending rollers 32-35 to a lamination station B where an aluminium foil 36 is converged with and laminated to the non-decorated side of the paper web with a lamination layer 37 which is extruded between the web and the foil in connection with these together being led through the nip between two lamination rollers 38.

The laminated paper web 30 is thereafter led further via an additional bending roller 39 to a coating station C where the web 30 is coated with outer, liquid-tight, heat-resistant coatings 40 and 41 which are extruded on both sides of the web 30 when the web 30 is led through the nip between two coating rollers 42.

From the coating station C, the laminated paper web 30 is thereafter led further for rolling up onto a magazine reel 43 for further processing and use.

Figure 4:
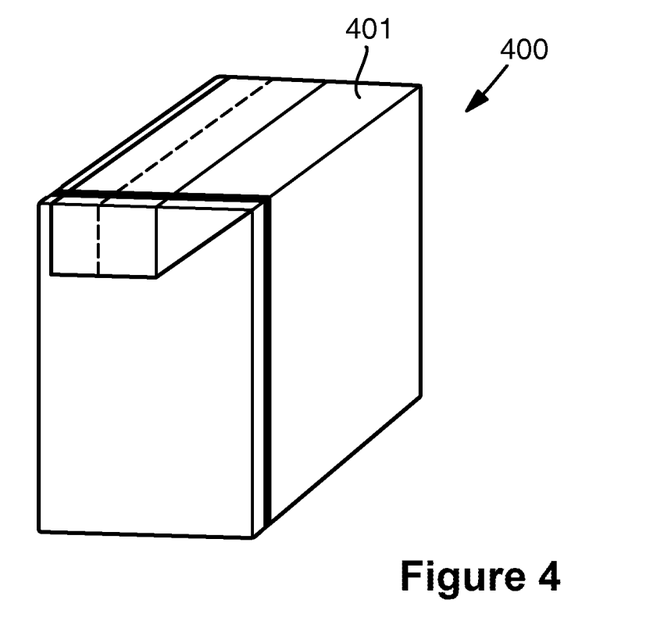
FIG. 4 is a perspective view of packaging container produced by fold forming and thermosealing of a packaging laminate according to the present invention.

As was mentioned previously, packaging containers may be produced from the packaging laminate according to the present invention which are of the type which, after filling and sealing, are to be subjected to a shelf-life-extending heat treatment in a retort with steam as the heat medium. One example of such a retortable packaging container is schematically illustrated in FIG. 4. The illustrated packaging container 400 is a substantially parallelepipedic package of the known packaging type which occurs on the market under the name Tetra Recart.

The packaging container 400 is produced from a prefabricated flat folded packaging blank of a packaging laminate according to the present invention in that the packaging blank is first raised to an open tubular container carton. The one end (e.g. the bottom end) of the container carton is sealed by fold forming and thermosealing of the corresponding end panels of the container carton for the formation of a liquid-tight substantially planar bottom closure. The container carton thus provided with a bottom is filled with the relevant food, and the other end of the filled container carton is sealed by an additional fold forming and thermosealing of the corresponding end panels of the container carton for the formation of a liquid-tight substantially planar top closure 401, as shown in FIG. 4.

The invention claimed is:

1. A packaging laminate for a packaging container which, after filling and sealing by thermosealing, is to be subjected to a shelf-life-extending heat treatment in a retort with steam as heat medium, the packaging laminate including a layer of paper or paperboard whose one surface has a printable coating of pigment and adhesive or binder in contact with the paper or paperboard layer, wherein the other side of the paper or paperboard layer has a coating of pigment and adhesive of the same type as the printable coating in contact with the paper or paperboard layer.

2. The packaging laminate as claimed in claim 1, wherein the printable coating on the one side of the paper or paperboard layer is of a greater thickness than the coating on the other side of the paper or paperboard layer.

3. The packaging laminate as claimed in claim 1, wherein the printable coating on the one side of the paper or paperboard layer is of a thickness or coating quantity of 15-30 g/m$^2$.

4. The packaging laminate as claimed in claim 1, wherein the coating on the other side of the paper or paperboard layer is of a thickness or coating quantity of less than 10 g/m$^2$.

5. The packaging laminate as claimed in claim 1 wherein the printable coating on the one side of the paper or paperboard layer is of a thickness or coating quantity of 20 g/m$^2$.

6. The packaging laminate as claimed in claim 1, wherein the coating on the other side of the paper or paperboard layer is of a thickness or coating quantity of approx. 5 g/m$^2$.

7. The packaging laminate as claimed in claim 1, further comprising, between the paper or paperboard layer and the outer, liquid-tight, heat-resistant layer on said second side of the paper or paperboard layer, a layer of a material possessing tightness properties vis-à-vis oxygen gas.

8. The packaging laminate as claimed in claim 1, further comprising outer, liquid-tight, heat-resistant layers on both sides of the paper or paperboard layer.

9. The packaging laminate as claimed in claim 8, wherein the outer, liquid-tight, heat-resistant layers on the both sides of the paper or paperboard layer are selected from the group essentially comprising high density polyethylene, linear low density polyethylene, polypropylene and polyester.

10. The packaging laminate as claimed in claim 1, further comprising, between the paper or paperboard layer and the outer, liquid-tight, heat-resistant layer on said second side of the paper or paperboard layer, a layer of a material possessing tightness properties vis-à-vis gases.

11. The packaging laminate as claimed in claim 10, wherein the layer possessing tightness properties vis-à-vis gases is an aluminium foil.

12. The packaging laminate as claimed in claim 1, wherein the coatings also include a substance which modifies the rheological properties of the coatings.

13. The packaging laminate as claimed in claim 12, wherein the substance which modifies the rheological properties of the coatings is selected from the group essentially comprising protein, polysaccharides, carboxy methyl cellulose, hydroxy ethyl cellulose, alkali soluble acrylic polymer emulsion, hydrofobically modified alkali soluble acrylic polymers, polyurethane, polyvinyl alcohol and starch.

14. A packaging container which is produced by fold forming and thermosealing of a packaging laminate as claimed in claim 1.

15. The packaging container as claimed in claim 14, wherein it is produced from a tubular, flat folded packaging blank of the packaging laminate in that the packaging blank is first raised to an open packaging carton, whose one end (e.g. the bottom end) is sealed by fold forming and thermosealing of corresponding foldable end panels of the packaging blank for the formation of a substantially planar end closure (e.g. bottom closure), whereafter the packaging carton provided with the bottom is filled with the desired food through its open end (e.g. the top end) which, after the filling operation, is sealed by an additional fold forming and thermosealing of the corresponding foldable end panels of the packaging blank for the formation of a substantially planar end closure (e.g. the top closure.

\* \* \* \* \*